Sept. 23, 1969    C. GROSS    3,468,727
METHOD OF TEMPERATURE COMPENSATING SEMICONDUCTOR STRAIN GAGES
Filed Nov. 15, 1966    2 Sheets-Sheet 1

INVENTOR
CHRIS GROSS

BY
ATTORNEYS

Sept. 23, 1969   C. GROSS   3,468,727
METHOD OF TEMPERATURE COMPENSATING SEMICONDUCTOR STRAIN GAGES
Filed Nov. 15, 1966   2 Sheets-Sheet 2

INVENTOR
CHRIS GROSS

BY
ATTORNEYS

United States Patent Office 3,468,727
Patented Sept. 23, 1969

3,468,727
METHOD OF TEMPERATURE COMPENSATING SEMICONDUCTOR STRAIN GAGES
Chris Gross, Hampton, Va., assignor to the United States of America as represented by the Administrator of the National Aeronautics and Space Administration
Filed Nov. 15, 1966, Ser. No. 594,584
Int. Cl. C22f 3/00
U.S. Cl. 148—13                                6 Claims

ABSTRACT OF THE DISCLOSURE

Semiconductor strain gages, although they are many times more sensitive to strain than the commonly used metallic foil gages, have found only limited use as precision strain transducers because of their undesirable temperature properties. These undesirable temperature properties include large changes in gage resistance and gage factor with temperature, and have limited the usefulness of the semiconductor gage.

According to the present invention radiation damage studies have provided a method of significantly reducing the sensitivity of the semiconductor gage to changes in temperature. The method according to the present invention comprises exposing commercially available semiconductor gages of a specific resistivity to a prescribed dose of high energy damaging radiation. After irradiation, the change in gage resistance and gage factor with temperature will be reduced by a factor of over twenty-five of the unirradiated gage over a 50° C. temperature interval.

---

The present invention was made by an employee of the National Aeronautic and Space Administration and may be manufactured and used by or for the Government of the United States without the payment of any royalties thereon or therefor.

Strain gages are employed in various types of transducers, such as motion sensing devices, accelerometers and other instruments for measuring movements, forces and pressures. In the testing of various instrumentation, structures and the like for use in a spatial environment it is obviously necessary that a wide temperature range capability be inherent in the gage structure. Semiconductor strain gages that are presently available offer a considerable improvement over metallic gage counterparts, particularly in the gage factor available, high resolution, small size, and signal to noise ratio. However, because of their undesirable temperature properties, semiconductor gages have found only limited use as precision strain transducers.

Accordingly, it is an object of the present invention to provide a method whereby the temperature properties of semiconductor strain gages may be improved through radiation damage.

Another object of the present invention is to provide semiconductor strain gages in which the temperature dependency of the gage resistance and gage factor have been improved.

Another object of the present invention is the method of temperature compensating semiconductor strain gages.

Yet another object of the present invention is the provision of an improved semiconductor strain gage.

According to the present invention the foregoing and other objects are obtained by exposing certain resistivities of commercially available semiconductor strain gages to high energy particulate radiation. After this exposure to radiation, the temperature dependence of the gage resistance and gage factor is greatly reduced.

A more complete appreciation of the invention and many of the attendant advantages thereof will be readily appreciated as the same becomes better understood by reference to the following detailed description when considered in connection with the accompanying drawings wherein.

Figure 1:
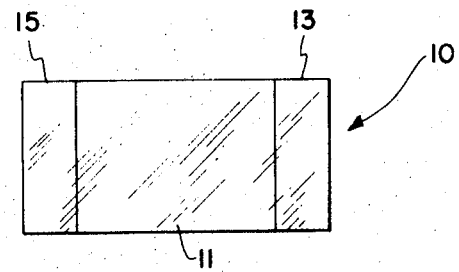
FIG. 1 is a view of an exemplary semiconductor strain gage.

Referring now to the drawings, and more particularly to FIG. 1, there is shown a typical semiconductor strain gage generally designated by reference numeral 10. Strain gage 10 consists of a thin filament of silicon 11 with a pair of metal contacts 13 and 15 provided on each end to permit the soldering of electrical leads to gage 10, in a conventional manner. The longitudinal axis of gage 10 is parallel to a specific crystallographic axis, the [111] axis for P-type material and the [100] axis for N-type material, to give the maximum gage sensitivity. The semiconductor gage 10 may be from thirty to ninety times as sensitive to strain as conventional metal gages depending upon the type and resistivity of the gage material.

Figure 2:
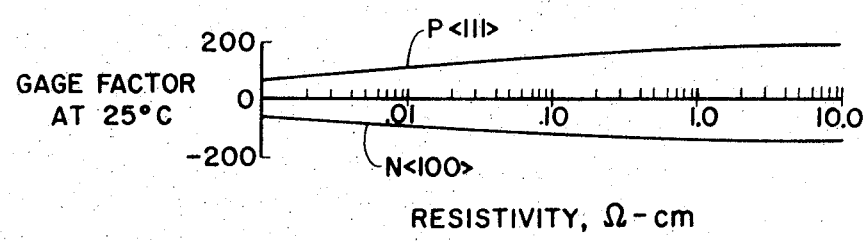
FIG. 2 is a graphical representation of the gage sensitivity vs. the resistivity of the gage material for silicon strain gages.

As shown more particularly in FIG. 2 the gage factor, which is a direct indication of the gage sensitivity vs. the resistivity of the gage material, for a silicon gage is shown. As shown therein, the gage factor varies from approximately 80 to 175 for the P-type and from —60 to —120 for the N-type gages depending upon the resistivity.

Figure 3:
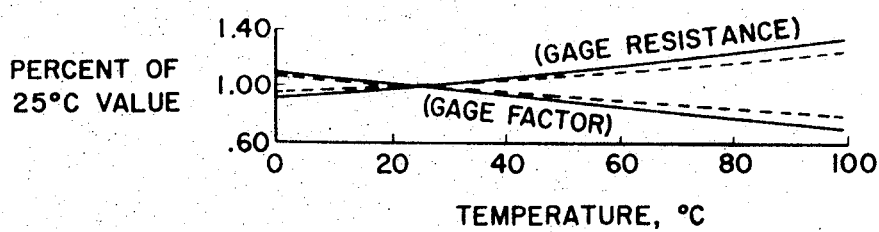
FIG. 3 is a graphical representation of gage resistance and gage factor vs. temperature for a specific semiconductor strain gage.

Referring now to FIG. 3, the temperature dependency of the gage resistance and gage factor is more clearly understood. As shown therein, the gage resistance and gage factor normalized to its 25° C. value is plotted vs. temperature for one of the most commonly used semiconductor gages, that is, a 0.05 ohm-cm. P-type gage. The gage resistance for a free filament experiences a 25% change from 25° to 100° C. while the bonded gage, that illustrated in FIG. 1, changes slightly more because of the difference in expansion coefficients of silicon and the material to which it is bonded. A reduction in gage factor of the same order as the increase in resistance is noted in this temperature interval. This behavior of the gage resistance and the gage factor with temperature may be more clearly understood by examining the equations governing its operation which are:

$$R_o = \rho \frac{L}{A} = \frac{1}{ne\mu} \frac{L}{A} \quad (1)$$

$$\text{gage factor} = \frac{\Delta R/R}{\epsilon} \quad (2)$$

The gage resistance $R_o$ is given by the product of the resistivity of the gage material $\rho$, and the ratio of the gage length L to its cross sectional area A. The resistivity may be written in fundamental terms as the reciprocal of the product of the carrier concentration $n$, the electronic charge $e$, and the carrier mobility $\mu$. From Equation 1, the difference between the operation of a metallic semiconductor gage may be pointed out. In most metallic gages, the change of resistance with strain is due primarily to a change of L/A, while in a semiconductor gage it is the change in carrier mobility $\mu$, that accounts primarily for the resistance change. Unfortunately, a change in temperature also changes the carrier mobility. For P-type silicon, whose resistivity is greater than 0.05 ohm-cm., the mobility decreases approximately as the temperature to the five-halves power; the gage resistance therefore increases at about the same rate. The increase in gage resistance, as can be seen from the formula for the gage factor, is defined as the ratio of the change in resistance $\Delta R$, due to a strain $\epsilon$, to the gage resistance divided by the strain, results in a decrease in gage factor since the gage sensitivity $\Delta R/\epsilon$, is not a strong function of temperature in gages whose resistivity is greater than .05 ohm-cm.

Table I, below gives a comparison of several properties of a semiconductor gage to like properties of the best available metal foil gage.

TABLE I

| Property | .05 ohm-cm. P-type silicon | Metal foil gage | Ratio |
| --- | --- | --- | --- |
| Strain gage factor $\left(\dfrac{\Delta R/R_o}{\epsilon}\right)$ | 140 | 2 | 70 |
| Thermal coef. res. (percent/50° C.) | 14 | .01 | 1,400 |
| Thermal coef. gage factor (percent/50° C.) | 14 | 0.5 | 28 |

The properties that are compared in Table I above, are the gage factor, temperature coefficients, and the temperature coefficient of the gage factor. The ratio of these properties is shown in the third column. The gage factor of a 0.05 ohm-cm. P-type gage, one of the most popular types, is 140 while that of the metallic gage is only about 2. It is the gage factor of the semiconductor gage, in this case seventy times as large as the metal foil gage, that makes it so attractive as a strain transducer. The next properties compared are the temperature coefficients of resistance and gage factor which points out why the semiconductor gage has only limited use as precision strain transducer. The temperature coefficients of resistance changes 14% per 50° C., some 1400 times more than the metal gage; and the temperature coefficient of the gage factor also changes 14% per 50° C. or twenty-eight times more than the metal gage. By significantly reducing these two quantities, that is, the temperature coefficient of resistance and gage factor, the usefulness of the semiconductor gage is greatly extended particularly to environments where the temperature changes are experienced and in the low strain measurement area.

According to the present invention, the reduction in the temperature coefficient results from the fact that the carrier concentration in the semiconductor material can be made to increase with temperature by exposing a semiconductor material to high-energy particulate radiation. From the formula for the gage resistance, it is seen that if the carrier concentration increases with temperature at the same time that the carrier mobility decreases with temperature, the resistance change will be zero. Since the gage sensitivity $\Delta R/\epsilon$ is farily constant over a large temperature interval the gage factor will change at about the same rate as the gage resistance.

Figures 4A, 4B, 4C:
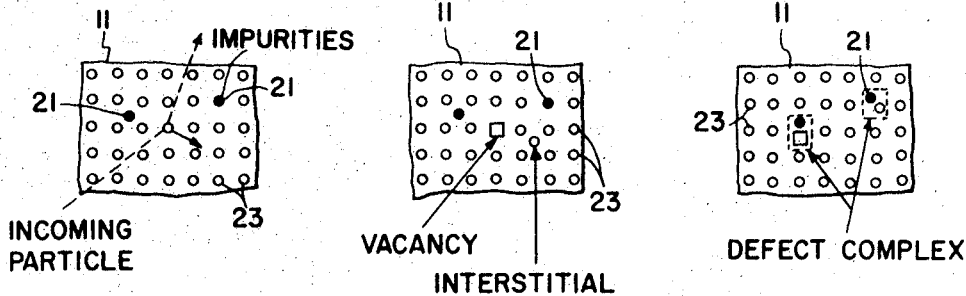
FIGS. 4a, 4b and 4c are schematical representations of one theory of operation when a semiconductor is irradiated.

A schematic pictorial representation of one theory of what happens when a semiconductor is irradiated is shown in FIGS. 4a, 4b and 4c, which illustrates a pictorial illustration of a semiconductor crystal lattice. In this lattice, impurity atoms, designated by reference numeral 21, are always present in minute quantities among the other atoms 23 of the semiconductor material. When a high-energy particle passes through the lattice, as designated by the broken line arrow, the high-energy particle may suffer a collision with a lattice atom and displace it from its normal lattice site to an interstitial position, leaving behind a vacancy (FIG. 4b). At room temperature, both the vacancy and interstitial are mobile and quickly migrate to an impurity atom site to form a defect complex, as designated by the broken squares in FIG. 4c. These defects give rise to donor and acceptor levels that are capable of trapping the charge carriers. The number of carriers trapped by these defects is a function of temperature, that is, the higher the temperature, the fewer carriers that are trapped. Hence, since the carriers can be thermally excited off the defect the carrier concentration will increase with temperature.

A theoretical calculation partially based on data collected in radiation damage studies indicated that the temperature coefficient of resistance of a certain resistivity of silicon could be reduced by a factor of 100 in the temperature interval between 0 and 100° C. To determine in practice what degree of temperature compensation could be achieved, various resistivities of silicon gages were exposed to two megavolt electron radiation, with the best results being obtained from the 5.0 ohm-cm. P-type gage.

In a specific irradiation process, six strain gages were held by their electrical leads in the path of the incident electron beam from an electron accelerator. The beam was scanned across the gages to insure that each gage was irradiated uniformly and a beam current of approximately $3 \times 10^{13}$ electrons/cm.$^2$ was used with a Faraday cup being positioned directly behind the gages to monitor the beam intensity. The six gages were irradiated until they exhibited a zero temperature coefficient at room temperature. This condition was determined by measuring the gage resistance for a low excitation current, about 0.1 ma., which caused very little self-heating and at a high excitation current, slightly greater than 2.0 ma., which produced considerable self-heating. When the gage resistance values were equal for the high and low excitation current value, the irradiation process was complete. After irradiation, the gage resistance becomes approximately twice that of the initial or unirradiated gage resistance. After irradiation, all of the gages were heated and maintained at approximately 175° C. for twenty-four hours to anneal out all of the relatively unstable defects.

In this specific example a Dynamitron accelerator was used to produce the electron radiation. As readily apparent to those skilled in the are the radiation damage may also be produced by Van de Graff and Linear accelerators as well as by any other charged particle accelerator that will produce the controlled damaging radiation. Thus, the invention is not considered limited to electron radiation damage but also includes the use of protons, alpha particles, deuterons, neutrons, and the like, to produce controlled radiation damage. It is also to be understood that the gages may be irradiated in the wafer form when so desired.

Figure 5:
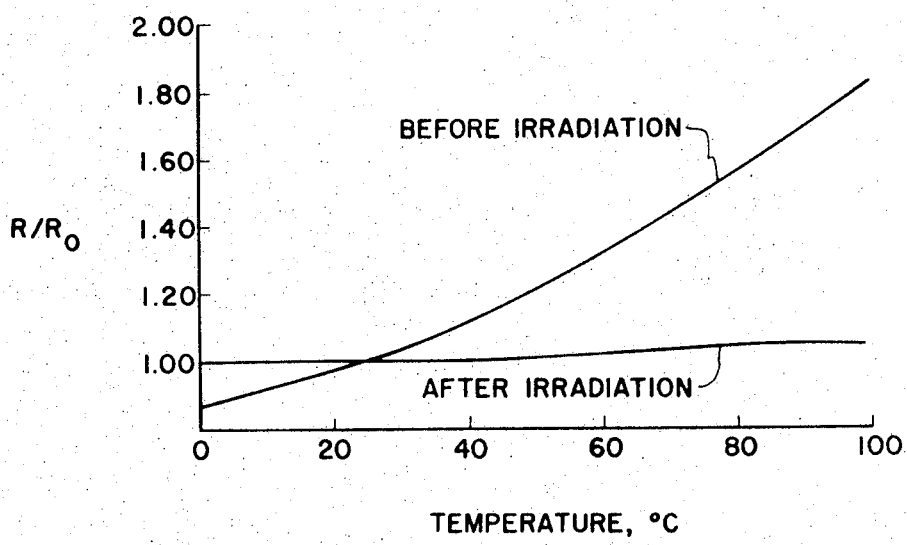
FIG. 5 is a graphical representation of the normalized gage resistance vs. temperature for a 5.0 ohm-cm. P-type silicon semiconductor according to the present invention.

The normalized gage resistance vs. temperature of a 5.0 ohm-cm. P-type silicon gage is illustrated graphically in FIG. 5. The initial resistance for this gage at 25° C. was 4500 ohms and after irradiation with 2 mev. electrons the gage resistance at 25° C. was 10,000 ohms. On this graph, the normalized resistance vs. temperature for an irradiated and unirradiated 5.0 ohm-cm. P-type silicon gage is plotted. The unirradiated gage changes resistance 50% between 25° and 100° C., while the irradiated gage, which had received a radiation dose equivalent to 100 years in space environment, changes only 6% over the same temperature interval. This eight-fold reduction in resistance change with temperature, is due to the carrier concentration increasing with temperature and offsetting the decrease in carrier mobility.

A comparison of similar properties of the irradiated semiconductor gage and the metal foil gage is shown in Table II below:

TABLE II

| Property | 5.0 ohm-cm. P-type irradiated silicon | Metal foil gage | Ratio |
| --- | --- | --- | --- |
| Strain gage factor $\left(\dfrac{\Delta R/R_o}{\epsilon}\right)$ | 160 | 2 | 80(70) |
| Thermal coef. res. (percent/50° C.) | 0.5 | .01 | 50(1,400) |
| Thermal coef. G.F. (percent/50° C.) | 0.5 | 0.5 | 1(28) |

The properties compared in Table II above are once again the strain gage factor, temperature coefficient of resistance, and the temperature coefficient of gage factor. The ratios obtained when the .05 ohm-cm. P-type gage was compared with the metallic foil gage are shown in parenthesis in the ratio column. The gage factor for the irradiated gage is 160, or some eighty times that of the metallic foil gage. The ratio is higher than that obtained earlier and arises not from the fact that the gages were irradiated but from the fact that the gage is a higher resistivity than that gage shown in Table I. The temperature coefficient of resistance has been reduced from factor 1400 to 50 times that of the metal gage. The temperature coefficient of the gage factor is now comparable to that of the metallic foil gage over a 50° C. temperature interval. The temperature performance of this irradiated gage over the 50° C. temperature interval is equivalent to that of the best metallic foil gage available on the market.

These reductions in the temperature coefficients greatly extend the usefulness of commercially available semiconductor strain gages. In the area of high-strain measurements, the semiconductor strain gage can now be used to make accurate measurements of strain in environments where extreme temperature changes are experienced. The advantage of the semiconductor gage over the metallic foil gage in this area is that the high output signal from the semiconductor gage simplifies the readout requirements. In the low strain measurement area, the high gage factor of the semiconductor gage makes possible the measurement of strain many times lower than possible with the metallic foil gage. However, the use of uncompensated semiconductor gages in this area is limited because all temperature changes give rise to considerable error in the strain measurement. In the irradiated semiconductor gage this error is reduced by a factor of twenty-eight therefore allowing a much more accurate measurement of small strain levels which is an important factor in the testing of various space instrumentation and structural materials.

Although the invention has been described more specifically relating to P-type silicon semiconductor strain gages, it is readily apparent to those skilled in the art that the teachings of this invention are readily adaptable to N-type silicon gages, as well as other semiconductor strain gage materials, such for example, germanium, gallium arsenide, indium antimonide, silicon carbide, aluminum antimonide, aluminum arsenate, aluminum phosphide, gallium antimonide, indium arsenate, and gallium phosphide, or any other presently known piezo-resistive materials. As is well known to those skilled in the art, these materials may be either N-type or P-type or may be predominately either one of these types but have layers or regions of the other types. There are obviously numerous variations and modifications of the above described illustrative temperature compensation process for semiconductor materials and no attempt has been made to illustrate all such possible arrangements. It is therefore to be understood that within the scope of the appended claims the invention may be practiced otherwise than as specifically described.

What is claimed as new and desired to be secured by Letters Patent of the United States is:

1. A method of temperature compensating semiconductor strain gages comprising:
   selecting a strain gage of the desired resistivity, irradiating the selected strain gage uniformally with a beam current of approximately $3 \times 10^{13}$ electrons/cm.$^2$ until said gage exhibits a zero temperature coefficient at room temperature thereby introducing radiation-produced defect levels in said gage, said radiation-produced defects affecting the temperature dependency of the carrier of the gage material so that it increases with increasing temperature and thereby offsets the usual decrease in carrier mobility with increasing temperature of the gage material, thereby resulting in a decrease in the temperature dependence of gage resistance of the semiconductor gage.

2. The method of claim 1 wherein said semiconductor strain gage is selected from the group consisting of silicon, germanium, gallium arsenide, indium antimonide, silicon carbide, aluminum antimonide, aluminum arsenate, aluminum phosphide, gallium antimonide, indium arsenate and gallium phosphide.

3. The method of claim 1 wherein said semiconductor strain gage is selected from P-type and N-type silicon.

4. The method of claim 1 wherein said semiconductor strain gage comprises a 5.0 ohm-cm. P-type silicon strain gage.

5. The method of claim 1 wherein said strain gage, after irradiation, is heated to and maintained at approximately 175° C. for approximately twenty-four hours to anneal out any relatively unstable defects.

6. A method of reducing the rate at which the resistance of a semiconductor strain gage changes with temperature comprising, irradiating said strain gage with 2 mev. electron radiation until said gage exhibits a zero temperature coefficient at room temperature to produce a permanent controlled radiation damage to said strain gage whereby said radiation damage reduces the rate at which the resistance of the strain gage changes with temperature.

References Cited

UNITED STATES PATENTS

| 2,786,880 | 3/1957 | McKay | 148—1.5 |
| 3,272,661 | 9/1966 | Tomono et al. | |
| 3,293,084 | 12/1966 | McCaldin | 148—1.5 |
| 3,311,510 | 3/1967 | Mandelkorn | 148—1.5 |

REUBEN EPSTEIN, Primary Examiner

U.S. Cl. X.R.

29—612; 148—4; 250—495; 338—3